United States Patent [19]

Reedman et al.

[11] Patent Number: 5,259,329
[45] Date of Patent: Nov. 9, 1993

[54] AUTOMATIC SEWING MACHINE SYSTEM

[75] Inventors: David C. Reedman, Mowbray, England; Andrew G. N. Walter, Oliver's Battery, United Kingdom; Ian Jolliffe, Cheltenham; David L. Smith, Sutton Park, both of England; Gaynor E. Taylor; Paul M. Taylor, both of Goxhill, England

[73] Assignee: British United Shoe Machinery Ltd., Leicester, England

[21] Appl. No.: 849,046

[22] PCT Filed: Aug. 28, 1991

[86] PCT No.: PCT/GB91/01449
§ 371 Date: Apr. 23, 1992
§ 102(e) Date: Apr. 23, 1992

[87] PCT Pub. No.: WO92/04493
PCT Pub. Date: Mar. 19, 1992

[30] Foreign Application Priority Data

Sep. 1, 1990 [GB] United Kingdom ............ 9019091

[51] Int. Cl.⁵ .............................................. D05B 21/00
[52] U.S. Cl. ............................................. 112/121.12
[58] Field of Search ................... 112/121.15, 121.12, 112/103, 102, 121.11; 271/227

[56] References Cited
U.S. PATENT DOCUMENTS 4,688,499  8/1987  Moore ........................... 112/121.12
4,776,579  10/1988  Romand et al. ........... 112/121.12 X
4,917,030  4/1990  Bisson et al. ................... 112/121.12
4,998,489  3/1991  Hisatake et al. ........... 112/121.12 X
5,021,965  6/1991  Olbrich ........................... 112/121.12
5,131,339  7/1992  Goodridge ....................... 112/262.3

Primary Examiner—Peter Nerbun

[57] ABSTRACT

A workpiece is supported by work support means (40; 40'; 40''; 44'; 142, 144) for movement in a first direction by co-operating workpiece clamping and feeding means (46; 142, 144), both said means being supported on a carriage (16) for movement in a second direction normal to the first to move a workpiece relative to a sewing machine head. Both of said means are arranged on both sides of an elongated aperture (42) extending in the second direction in alignment with a needle penetration point (N). Stepping motors (24; 60) are provided for moving the carriage (16) and operating the workpiece clamping and feeding means (46; 142, 144) under programmed control. A camera (70) is also provided aligned with the aperture 42, for detecting the peripheral outline of a workpiece fed therebeneath. Computer means is effective, in response to the detected outline, to identify the workpiece type and its orientation and location on the workpiece support means and accesses an appropriate stitch pattern data file and modifies the data to take account of the workpiece orientation and location. The workpiece is then sewn according to the thus modified data.

13 Claims, 4 Drawing Sheets

AUTOMATIC SEWING MACHINE SYSTEM

TECHNICAL FIELD

This invention is concerned with improvements in or relating to automatic sewing machine systems, that is to say, systems in which decorative stitch patterns are sewn onto workpieces, or workpiece components are joined together by stitching along other than linear paths, under programmed control, in which systems, some form of workpiece holder is provided between which and a sewing head relative movement can be effected under programmed control along two co-ordinate axes.

BACKGROUND ART

Such systems are described e.g. in U.S. Pat. Nos. 4,171,671 and 4,406,234. As will be observed from these patent specifications, the workpiece holder may take the form of an arrangement of clamps between which various components may be clamped together in the sewing machine in a pre-determined relationship for a 'join and sew' operation to be performed thereon. Alternatively so-called pallets may be used in which either a workpiece, in the case of decorative stitching, or a plurality of workpiece components, in the case of a 'join and sew' operation, may be clamped in a correct location. One such pallet is described in U.S. Pat. No. 3,988,993.

Whereas pallets successfully serve to hold workpieces in a desired registration (location and orientation) for a sewing operation to be performed thereon, and also have the advantage (as compared with machine clamps) that they can be locked away from the sewing machine so that the machine can continue operating while the next pallet is being loaded, nevertheless the use of pallets in this way (i) gives rise to significant expenditure in terms not only of the initial costs of pallet manufacture but also of storage (in which regard it must be borne in mind that each different type, style and size of workpiece requires its own pallet, except where some compromise between e.g. sizes can be accommodated), (ii) is time-consuming in terms of ensuring that the correct pallet is retrieved from the storage and made available to the operator for the particular workpiece to be sewn, and (iii) is labour-intensive in that for each pallet the workpiece(s) must be loaded into the pallet, the pallet must then be placed in the machine, and at the end of the sewing operation the pallet must first be unloaded from the machine and the finished workpiece then be removed from the pallet.

In the clothing industry, as an alternative to clamping workpieces in pallets a system of belts is used between which workpieces or workpiece components can be held and be advanced into a sewing position, whereafter relative transverse movement is effected between such system and a sewing head to cause a sewing operation to take place on such workpieces (or components). One apparatus including a system of belts operable in this manner is described in GB-A 2 144 777. The purpose of the use of a system of belts in such a case is not, however, concerned with the stitching of complicated patterns on workpieces or the joining of workpiece components together by stitching by effecting relative movement between the workpieces (or components) and the sewing head simultaneously along two co-ordinate axes, but rather merely with initially locating workpieces or components in a desired location and orientation and thereafter sewing them. It does not, therefore, address the problems set out above, which arise from the use of pallets.

It is one of the objects of the present invention to provide an improved automatic sewing machine system in which the use of pallets is dispensed with, while nevertheless enabling a workpiece (or workpiece components) to be held in a known location and orientation for a desired stitch pattern to be sewn thereon by effecting relative movement between the workpiece and a sewing head along two co-ordinate axes under programmed control.

DISCLOSURE OF INVENTION

The invention thus provides an automatic sewing machine system comprising workpiece support means for supporting a workpiece, said means having an elongated aperture, workpiece clamping means co-operable with the workpiece support means and including at least two clamping arrangements, one at each side of said elongated aperture, for holding a workpiece against the workpiece support means, a camera and co-operating light source arranged in alignment with said elongated aperture, one above it and the other below, and a sewing head, including a reciprocable needle, also arranged in alignment with said aperture such that the needle, as it reciprocates, can pass therethrough, wherein at least one of the workpiece support means and workpiece clamping means comprises feeding elements, arranged at opposite sides of the elongated aperture, whereby a workpiece held therebetween as aforesaid can be fed in a first direction extending transversely of the aperture and thus relative to the camera and light source and also relative to the needle in said first direction, and wherein the system further comprises drive means for effecting relative movement between the camera and co-operating light source on the one hand and the workpiece support means and the workpiece clamping means on the other, and also between the sewing head on the one hand and the workpiece support means and the workpiece clamping means on the other, in a second direction extending parallel to the elongated aperture, and computer control means for controlling the operation of the feeding elements and also of the drive means, the arrangement being such that, with a workpiece held between the workpiece support means and the workpiece clamping means, in a first, shape-recognition, operation by effecting relative movement between the workpiece and the camera in at least said first direction the outline of said workpiece, as it passes over the elongated aperture, can be detected by the camera, and thereafter, while the workpiece remains thus held, in a second, sewing, operation by effecting relative movement between the workpiece and sewing head in said first and second directions in timed relation with the reciprocation of the needle the workpiece can be sewn in accordance with a desired stitch pattern.

It will thus be appreciated that, by using the system in accordance with the invention the use of pallets can be dispensed with while nevertheless ensuring that the accurate registration of each workpiece is achieved, in particular by firstly holding the workpiece in a clamped condition, (i.e. a condition in which it cannot be moved freely, but in which it can be subjected to controlled movement), thereafter determining its location and orientation and, while it remains thus clamped (and thus without losing its registration), effecting a sewing operation on it. In this way, it will also be appreciated, significant savings can be made in expense, by dispensing with the need for pallets and for storing them, in time, because the need to retrieve pallets is also dispensed with, and in labour, since loading and unloading of the system only (i.e. not of pallets) can now be achieved automatically. A significant advantage of this system, moreover, resides in that the workpiece can now be presented to the system in a random orientation merely by being placed upon the workpiece support means in such a position that it can be engaged by the workpiece clamping means; in this way the versatility of the system is significantly enhanced.

To enhance still further the versatility of the system and its efficiency (preferably after said outline has been detected by the camera) in response to such detection, the computer control means is effective both to recognize the workpiece shape and also to determine its orientation in relation to the workpiece support. In response to such recognition and determination to identify from a plurality of sets of stitch pattern data stored in a memory of the computer control means, a particular set of data previously associated with the recognised workpiece is modified according to the orientation of the workpiece, while the workpiece remains held between the workpiece support means and workpiece clamping means, relative movement is effected between the workpiece and the needle along a desired stitch pattern as determined by the modified set of data in timed relation with the reciprocation of the needle and is thus sewn in accordance with said pattern.

In feeding workpieces by the aforementioned means it has been found that under certain circumstances there is a tendency for the workpiece to "drift" i.e. deviate laterally from the direction in which it is being fed, i.e. the first direction. The amount of such drift depends to a large extent upon the nature of the surface of the workpiece; for example, if a workpiece has a significantly ribbed surface and in particular if the ribs extend obliquely to the first direction, then there is a tendency for such workpiece to be fed sideways. Problems have, however, also been found to occur leading to longitudinal drift, resulting in inaccurate feeding of the workpiece in said first direction. In order to overcome such problems, in accordance with the present invention preferably prior to the outline of a workpiece being detected as aforesaid the workpiece is fed backwards and forwards in said first direction by the feeding elements in a small number of passes. In this way, the workpiece effectively "beds in" to the surface of the feeding element prior to actual feeding being initiated. Other features will be referred to hereinafter with regard to avoiding the occurrence of lateral drift.

If desired the sewing head may be moved in said second direction relative to the workpiece clamping means and the workpiece support means, but preferably in accordance with the present invention the system comprises a frame on which the camera and also the sewing head are fixedly mounted, and a carriage on which the workpiece support means and the workpiece clamping means are carried and which is mounted on the frame for movement relative to the camera and light source and also relative to the sewing head in said second direction under the operation of the drive means.

Various systems in accordance with the invention will be described hereinafter, to illustrate the invention by way of example, and in a first illustrative system the workpiece support means comprises two table portions arranged one at each side of the needle and providing therebetween the elongated aperture, the arrangement being such that the workpiece clamping means is effective to hold a workpiece against each table portion and move it relative thereto in said first direction. In a second illustrative system, on the other hand, the workpiece support means comprises a plurality of rollers, at least one of which is arranged at each side of the elongated aperture; preferably, furthermore, each roller of the workpiece support means is an idler roller. Preferably the overall diameter of each roller of the workpiece support means is in the order of 35 mm. Moreover, conveniently the workpiece-engaging surface of each roller of the workpiece support means is provided by a layer of deformable material which does not wholly conform to the contour of the workpiece engaged thereby, e.g. an expanded polystyrene. It has been found that, using such a material, any tendency of the rollers of the workpiece support means to "steer" the workpiece is mitigated.

In a third illustrative system the workpiece support means comprises a plurality of sets of wheels, the wheels being spaced apart along the direction of elongation of the aperture, and at least one of said sets being arranged at each side of said aperture; again, said sets of wheels are non-driven. In a fourth illustrative system, furthermore, the workpiece support means comprises a plurality of rotary brushes at least one of which is arranged at each side of the aperture; again, the brushes are non-driven.

In each of the various illustrative systems referred to above, conveniently the feeding elements form part of the workpiece clamping means, said elements each comprising a driven rotary element, e.g. a roller. Moreover, in each of the second, third and fourth illustrative systems, preferably each driven roller cooperates with at least one of the elements of the workpiece support means, whether roller, set of wheels or brush. In each of the illustrative systems, therefore, each feeding element forms a nip with the work support means by which a workpiece can be held and fed as said element is driven and thus caused to rotate.

As previously mentioned, in feeding workpieces by the aforementioned means it has been found that under certain circumstances there is a tendency for the workpiece to "drift" laterally from the direction in which it is being fed, i.e. the first direction. In order to overcome this tendency, certain features have been incorporated in the various elements of the system. Thus, for example, preferably the overall diameter of each roller constituting a feeding element is in the order of 10 to 15 mm. In addition, preferably, the workpiece-engaging surface of each such roller has a frictional co-efficient substantially greater than that of the opposite workpiece-engaging surface provided by the workpiece support means. A particularly advantageous workpiece-engaging surface is constituted by a layer of a tacky but non-adhesive material, e.g. an RTV silicone rubber. Alternatively, the workpiece-engaging surface may be constituted by a layer of abrasive material, e.g. emery paper or cloth.

Furthermore, desirably the feeding elements are resiliently urged towards the workpiece support means. Moreover, it has been found that only sufficient pressure necessary to afford the desired traction should preferably be applied; in practice, advantageously a load of up to 30 Newtons is applied to the workpiece clamping and feeding means to urge it resiliently towards the workpiece support means.

Advantageously, in each of the illustrative systems referred to above, the feeding of a workpiece by the workpiece feeding elements is effected in timed relation with the reciprocation of the needle. One advantageous manner in which such feeding can be achieved, furthermore, is where n.c. (i.e. numerical controlled) motor means (as hereinafter defined) is provided for driving the feeding elements and also for effecting relative movement in said second direction (and thus form part of the drive means). Thus, where a carriage is provided, preferably it is driven by said n.c. motor means. By the phrase "n.c. motor means" where used herein is to be understood a motor (or motors) the operation of which is controlled by control signals supplied thereto in accordance with stored information appropriate to a desired operation. Examples of such motors are stepping motors and d.c. servo motors.

In a fifth illustrative system each feeding element has a flat workpiece-engaging surface and is movable to-and-fro in said first direction and also heightwise in relation to the workpiece support means and can thus effect an intermittent feed of the workpiece relative to the needle in said first direction in timed relation with the reciprocation of the needle. Whereas such a feeding arrangement would be appropriate where the workpiece support means comprises a table or the like (as e.g. in the case of the first illustrative system), preferably the workpiece support means also comprises, associated one with each feeding element, a plurality of elements each having a flat workpiece-engaging surface, each such element of the workpiece support means effecting a mirror-opposite (viewed along the plane in which the workpiece is fed) to that of its associated feeding element. In this way, it will be appreciated, a reciprocatory "orbital" feed system is provided. In order, furthermore, to ensure that, using such a feed system, the workpiece remains clamped at all times, preferably at least one fixed element (i.e. fixed against advancing movement in said first direction) is provided at each side of the elongated aperture, which element closed on the workpiece prior to its release by the feeding element(s); again, preferably a corresponding fixed element is also provided as part of the workpiece support means. As in the case of the first, second, third and fourth illustrative systems, furthermore, n.c. motor means (as hereinbefore defined) is provided for operating the various elements.

It has been found that, using any one of the illustrative systems referred to above, workpieces can be stitched without recourse to the use of a pallet, while nevertheless being held in correct registration in relation to the sewing head and being moved along a controlled path. Such a system operates very satisfactorily in the case of workpieces made up of a single component, e.g. for purposes of decorative stitching, and indeed in the case of workpieces comprising multiple components, whether for constructional or decorative stitching. In the latter event, preferably in order to ensure that the various components do not move in relation to one another during stitching or feeding, conveniently they may be bonded together prior to the stitching operation being effected.

There now follows a detailed description, to be read with reference to the accompanying drawings, of the various illustrative systems referred to above. It will of course be appreciated that these illustrative systems have been selected merely by way of exemplification of the invention and not by way of limitation thereof.

MODES FOR CARRYING OUT THE INVENTION

Figure 1:
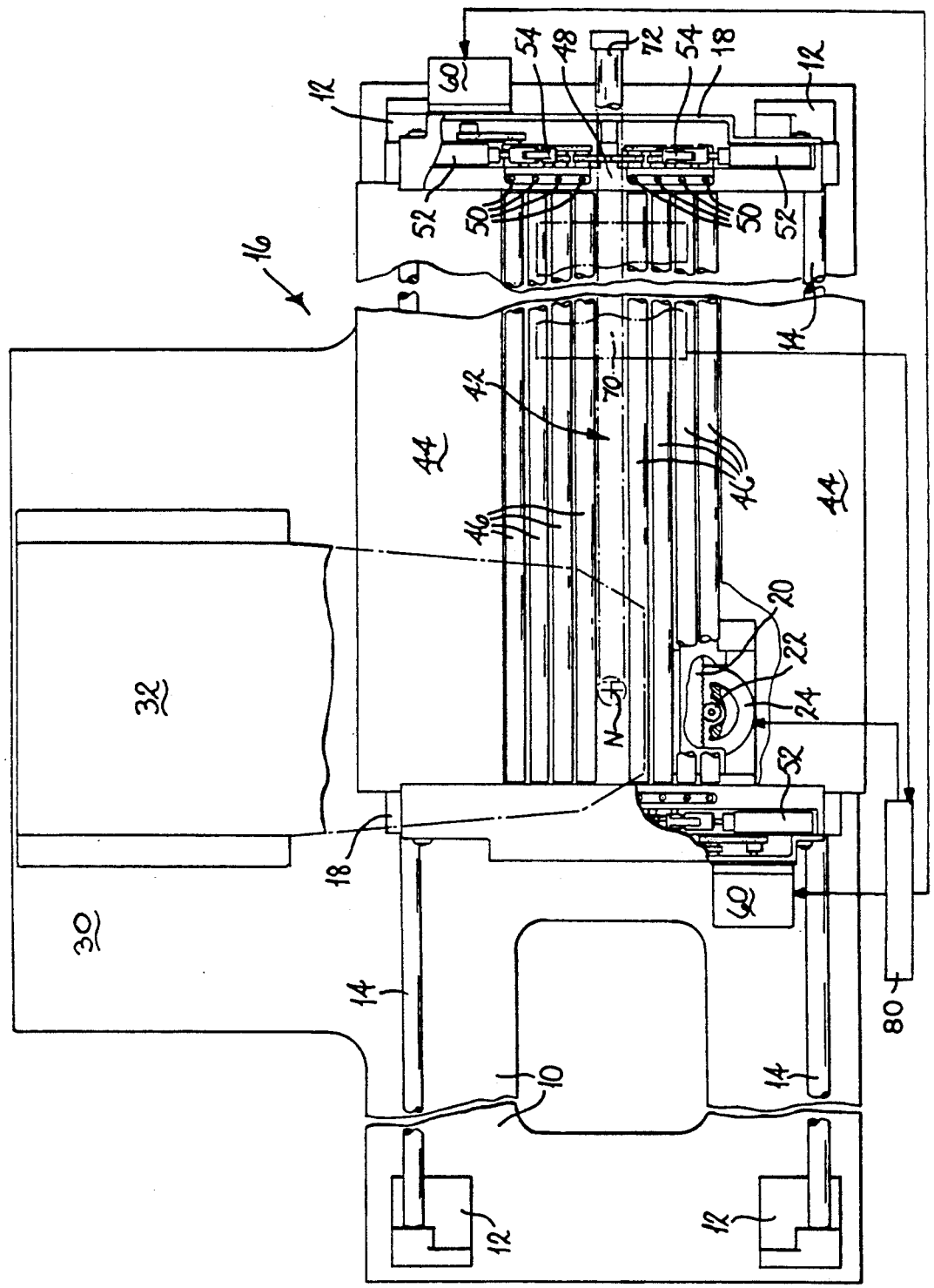
FIG. 1 is a plan view, with parts broken away, of the second illustrative system.

With reference to FIG. 1, the second illustrative system comprises a base 10 on which are supported, by means of four supports 12 arranged one at each corner of the base, two transverse carrier rods 14 on which is supported, for movement therealong, a carriage generally designated 16. The carriage 16 comprises two end blocks 18, each block having at each of its ends a lug in which is formed a bore by which the block is supported on the carrier rods 14. The end blocks 18 are connected together by two racks 20 (one only shown in FIG. 1) each meshing with a drive gear 22 secured on the output drive shaft of a stepping motor 24 mounted on the base 10. The two stepping motors 24 are driven in synchronism with one another and thus serve to drive the carriage 16 transversely along the carrier rods 14.

At the rear of the base is formed an extension 30 on which is mounted a sewing machine, only the base 32 of the casting of which is shown in FIG. 1. The sewing machine is conventional and its arm projects forwardly over the path of the carriage 16, such that the path of the reciprocating needle of the machine lies on a line which is parallel with the carrier rods 14 and centrally thereof. The point at which the needle penetrates the path of the carriage is indicated by the letter N in FIG. 1 (which is hereinafter referred to as the needle penetration point). The only modification made to the sewing machine is the provision of a shaft encoder (not shown) by which it can be ensured, in a conventional manner, that the movement of the carriage 16 under the control of the stepping motors 24 is effected in timed relation with reciprocation of the sewing needle.

In order to ensure that the carriage does not move so far along the carrier rods 14 that one of the end blocks 18 thereof is disposed below the needle, the left-hand supports 12 constitute end stops for the carriage, and in addition at a point intermediate the left-hand and right-hand supports 12 two further supports (not shown) may be provided which serve as end stops for limiting the movement to the right (viewing FIG. 1) of the carriage 16; it will of course be appreciated that in each case the supports serving as end stops are engaged by the left-hand (viewing FIG. 1) end block 18 of the carriage. The further supports of course also provide further support for the carrier rods 14 intermediate their length.

The carriage 16 supports workpiece support means and workpiece clamping and feeding means, which will now be described. In the second illustrative system the workpiece support means comprises two sets of work support rollers, each set comprising four rollers 40 (see FIG. 4). End portions of each of the rollers 40 are supported in the end blocks 18 for rotation therein. The uppermost part of the workpiece support surface of each of the rollers lie in a common plane (hereinafter called the workpiece support plane). Also as seen from FIG. 4, an aperture 42 is provided between the two sets of rollers, and from FIG. 1 it will be clear that this aperture 42 extends parallel to the path of the carriage 16 and is aligned with, and accommodates, the needle penetration point N. The workpiece support means further comprises two table portions 44, arranged one on the outside of each set of rollers, and the workpiece support surface of each table portion 44 lying also in the workpiece support plane.

Each workpiece support roller 40 is non-driven, i.e. is an idler roller, and the overall diameter of each roller is in the order of 35 mm. It has been found desirable to provide a workpiece-engaging surface on each roller which conforms to a limited extent to the contour of the workpiece, but not wholly so, since it has been found that where complete conformation arises there may be a tendency for the workpiece to "drift" laterally, i.e. in a direction along the length of the workpiece support rollers. It has been found that by providing a layer of deformable material, more particularly an expanded polystyrene material, the desired degree of conformability is achieved.

Figure 4:
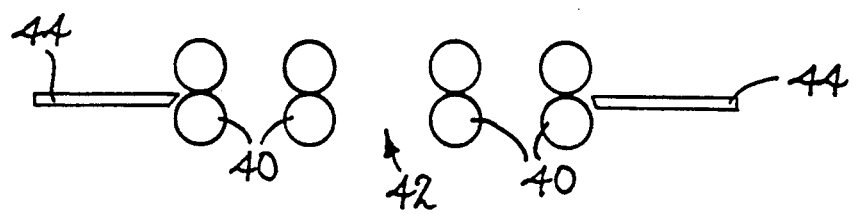
FIG. 4 is a view generally similar to FIG. 3, but of the second illustrative system.

The workpiece clamping and feeding means of the second illustrative system also comprises two sets of workpiece clamping and feeding rollers 46, each set comprising four such rollers. As shown in FIG. 4, one such roller 46 is associated with each workpiece support roller 40, the arrangement being such that the axes of associated rollers lie vertically one above the other. As will be seen from FIG. 1, moreover the sets of rollers 46 are so arranged as also to provide the aperture 42 therebetween, said aperture thus extending parallel, substantially so, to the rollers 46.

Each roller 46 has its end portions of reduced diameter, and the reduced end portions pass through vertical slots formed in each of the end blocks 18 and are supported in a lifting frame 48 for heightwise movement relative to the end blocks 18. The rollers 46 are thus able to be lifted bodily as a unit away from the workpiece support rollers 40. In addition, the reduced diameter end portion of each roller is supported in a bearing block 50 which is spring-urged downwardly under a light, but adjustable, pressure, whereby each roller is resiliently urged towards its associated workpiece support roller 40. A load of up to 30 Newtons applied to each roller has been found satisfactory for this purpose. For raising the lifting frame 48, furthermore, four piston-and-cylinder arrangements 52 are provided, mounted one at each corner of the carriage 16 and connected via a pivoting lever 54 with the lifting frame, the four arrangements 52 operating in synchronism with one another for this purpose.

Each of the workpiece clamping and feeding rollers 46 has a diameter in the order of 10 to 15 mm and the workpiece-engaging surface of each roller has a frictional coefficient substantially greater than that of the workpiece-engaging surface of the associated rollers 40. In one embodiment of the invention the workpiece-engaging surface of each roller 46 may be constituted by a layer of abrasive material, e.g. emery paper or cloth. Where such a surface is provided, it has been found desirable to effect a number of passes, forwards and backwards, of the workpiece by operation of the workpiece clamping and feeding means thus to "bed in" the workpiece to said rollers and thus mitigate or overcome any tendency of the workpiece to drift laterally relative to the rollers.

In the second illustrative system, on the other hand, the surface of each roller 46 is constituted by a layer of a tacky but non-adhesive material. One such material is a silicone rubber available from Dowty Woodville Polymers Ltd, of Swadlincote, England, under the trade name WPSP 3707.

A further suitable silicone rubber for use in the rollers 46 of the first, second, third and fourth illustrative systems has also been found to be a room temperature curing silicone rubber identified as RTV 112 and supplied by James Dawson & Son Ltd. of Lincoln, England.

Using such a material for the surface of the rollers 46, it has been found that only a relatively light pressure is required to be applied to each roller through the aforementioned springs, and more particularly a load of up to 30 Newtons, applied to the workpiece clamping and feeding means as a whole, has been found to be satisfactory.

The rollers 46 are driven in synchronism with one another, each set of rollers having associated therewith a stepping motor 60, said motors being arranged diagonally opposite one another on the carriage 16, more particularly one on each of the end blocks 18 (see FIG. 1). Each stepping motor 60 is operatively connected to the rollers 46 of its set by timing belts 62 and double pulleys 64 mounted on the ends of the rollers. The stepping motors 60 are so mounted on the end blocks 18 that heightwise movement of the lifting frame 48 does not affect the driving relationship between the motor and the first of the pulleys.

The second illustrative system further comprises a camera 70 which is mounted on a frame (not shown) above the carriage 16 and to the right-hand side (viewing FIG. 1) of the sewing machine, in alignment with the aperture 42. For cooperating with the camera 70 a lamp 72 is arranged beneath the carriage 16 so as to backlight (i.e. illuminate from behind) the aperture 42. The camera 70 comprises an array of cells by which, in a line scanning operation, the peripheral outline of a workpiece being fed across the aperture 42 can be progressively detected, i.e. line by line.

The camera and its associated detection system are generally similar to that described in GB-A 2067326. Thus, this system is capable of operating in a "teaching" mode in which, by scanning the peripheral outline of a workpiece moved progressively across the aperture 42 and by processing the signals thus obtained from the camera, as described in the aforementioned UK specification, a unique set of parameters for each "taught" workpiece can be determined, which set of parameters is then stored in a computer memory forming part of the system. The system also operates in a "recognition" mode in which again, using the same principles, a set of parameters is determined for a workpiece presented thereto, but in this case the set of parameters is compared with the stored sets and an identification of the presented workpiece is thus established, again as described in said U.K. specification.

In incorporating this system into the second illustrative system, there is associated with each stored set of parameters a stitch pattern data file which contains instructions for the various stepping motors 60, 24 of the workpiece clamping and feeding means and the drive means, which instructions thus define the appropriate movements to be imparted to the workpiece in the first and second directions to move it relative to the sewing needle in accordance with the stitch pattern associated with the workpiece identification. Thus when a workpiece is recognized in the recognition mode of the camera/detection system and its set of parameters is determined, the relevant stitch pattern data file is automatically accessed for the appropriate stitch pattern to be sewn on the workpiece.

The camera/detection system, in its recognition mode, also identifies the location and orientation of the workpiece presented thereto and is capable of modifying the data stored in the appropriate stitch pattern data file, prior to commencement of the sewing operation, to take into account the location of orientation of the workpiece as determined by said system.

Thus, in the operation of the second illustrative system, the operator first places a workpiece to be operated upon on the forward table portion 44 and feeds the workpiece into the nip formed by the first rollers 40, 46, whereupon the workpiece is fed by the operation of the driven rollers 46 beneath the camera 70 and across the aperture 42 in a first, workpiece recognition, step. As already mentioned, in this step not only is the workpiece shape detected and thus identified, but also the orientation of the workpiece is determined and its location within the rollers 40, 46, and in accordance with such detection firstly the desired stitching pattern data file is accessed and the data is then modified in accordance with the orientation and location of the workpiece. Under the programmed control of this modified data the carriage 16 is then driven and the rollers 46 are also driven to move the workpiece in the first and second directions so that the start position for the stitching is coincident with the needle penetration point N, and thereupon a sewing cycle is initiated, the stepping motors 24, 60 receiving drive signals according to the modified stitch pattern data whereby the carriage 16 and the rollers 46 are operated in order to cause the workpiece to follow the desired path. It will of course be appreciated that, as already mentioned, in the operation of the system the drive signals are supplied as aforesaid in timed relation with the reciprocation of the needle; more particularly, the workpiece is moved only when the needle is out of the workpiece.

It will thus be appreciated that an automatic stitching operation can be performed on a workpiece without the need for the workpiece to be held in a pallet in accordance with a programmed instruction, serving to supply the desired drive signals to the stepping motors 24, 60, according to the particular stitch pattern appropriate to the workpiece. In the second illustrative system, moreover, a computer means (80) by which the drive signals are supplied to the motors 24, 60 also provides the memory store in which the stitch pattern data files are stored and from which they can be accessed in accordance with the workpiece identification.

Figure 2:
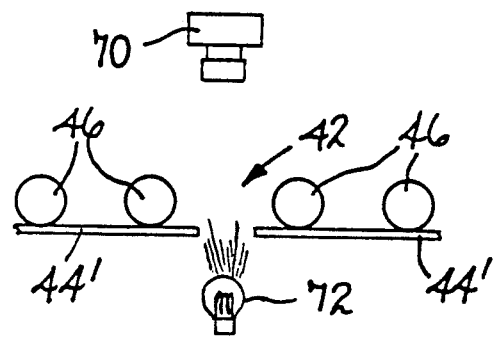
FIGS. 2 and 3 are diagramatic representations respectively of a workpiece shape recognition station and a sewing station of the first illustrative system.
Figure 3:
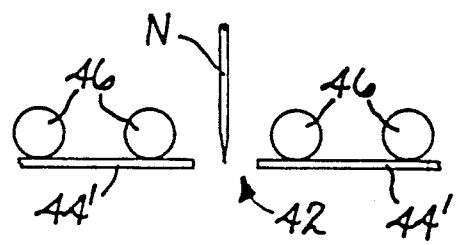

The first illustrative system is generally similar to the second, but in the case of the first system the workpiece support rollers 40 are replaced by extended table portions 44' which extend inwards up to the edge of the aperture 42 (see FIGS. 2 and 3). The workpiece-engaging surface of such table portions is of relatively low frictional coefficient in order to allow the workpiece to slide on said surface in response to the driven rotation of the rollers 46.

Figure 5:
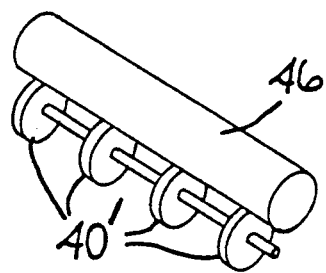
FIG. 5 is a fragmentary perspective view of part of the third illustrative system.

The third illustrative system (FIG. 5) is also generally similar to the second illustrative system, but differs in that the rollers 40 in this case are replaced by sets of wheels 40', one such set being associated with each roller 46. The spacing of such wheels 40' should be no greater than the width of the aperture 42. These wheels 40', furthermore, are freely rotatable relative to one another, which again has been considered to reduce the tendency of the workpiece to drift laterally as it is being fed.

Figure 6:
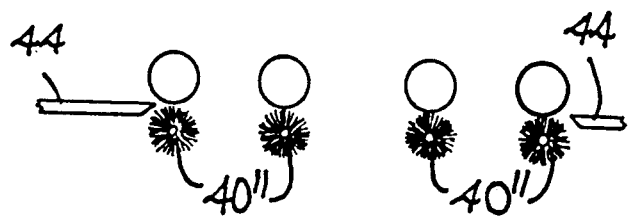
FIG. 6 is a view similar to FIGS. 3 and 4, but of the fourth illustrative system.

The fourth illustrative system (FIG. 6) is again generally similar to the second illustrative system except that the rolls 40 in this case are replaced by rotary brushes 40''; the bristles of which extend radially from the centre. It has been found, using such brushes, that adequate support of the workpiece can be achieved without substantial contact between the workpiece support elements and the workpiece itself (one cause of lateral drift being considered to be too great a contact between the workpiece support elements and the workpiece).

Figure 7A:
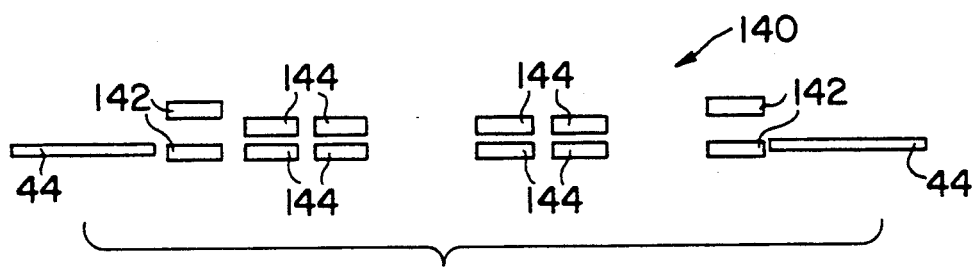
FIGS. 7a, 7b and 7c show diagrammatically the operation of feeding elements of the fifth illustrative system.
Figure 7B:
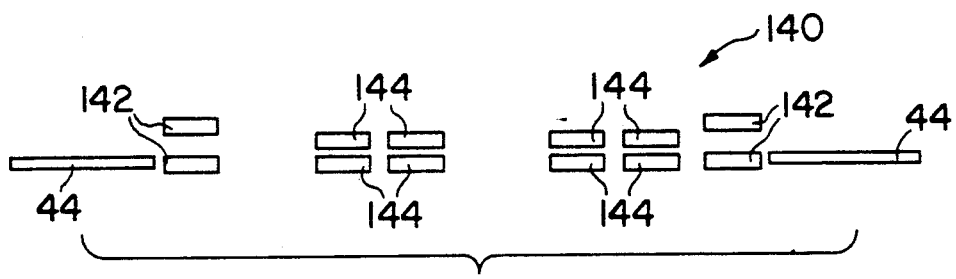

The fifth illustrative system (FIGS. 7a, 7b, 7c) is again generally similar to the second illustrative system, but in this case the rollers 46 of the workpiece clamping and feeding means as well as the rollers 40 of the workpiece support means are replaced by a systems of clamps generally designated 140. More particularly, this system of clamps includes, at each side of the aperture 42, a plurality of (specifically in the system described three) pairs of upper and lower clamps 142, 144, each having a flat workpiece-engaging surface so that workpieces can be clamped therebetween. One of these pairs (142) is arranged adjacent its associated table portion 44 and is fixed against movement in the feed direction, but the upper clamp is movable heightwise relative to the lower clamp thus to clamp or release a workpiece located therebetween. The other two pairs of clamps 144 are movable bodily together between the "fixed" clamps 142 by a distance preferably not exceeding the width of one pair of clamps 144, and in addition each upper clamp 144 is movable heightwise in relation to its associated lower clamp thus to clamp or release a workpiece located therebetween.

Figure 7C:
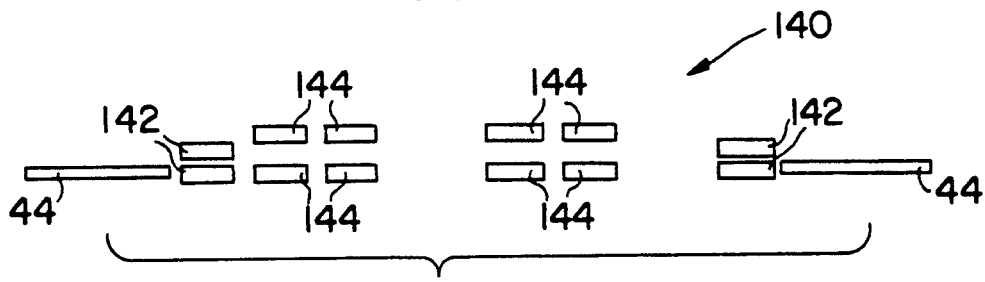

In the operation of the fifth illustrative system with all the clamps open a workpiece is fed past the fixed clamps 142 and into a first of the pairs of clamps 144, such that the workpiece does not project into the aperture 42. Thereafter, the clamps 144 are closed (FIG. 7a) and moved bodily in the feed direction through the set distance, and when this distance has been completed (FIG. 7b) the fixed clamps 142 are closed and the clamps 144 open so that the workpiece is held by at least one fixed clamp, whereupon the open clamps 144 are then returned to the start position (FIG. 7c). In this position the clamps 144 again close on the workpiece and the clamps 142 are opened thus releasing the workpiece for further feeding movement under the action of the clamps 144. As in the case of the other illustrative systems, the clamps 144 move in timed relation to the reciprocation of the needle; that is to say, no movement of the clamp takes place while the needle is in the work. It will of course be appreciated that in feeding a workpiece by means of such orbitally operated clamps the workpiece may be moved forwards and backwards in feed direction according to the stitch pattern to be sewn and the release of the workpiece as aforesaid by the clamps 144 takes place only when the set distance has been traversed.

In order to accommodate the driving of the clamps 144 (as opposed to the rollers 46 of the second illustrative system) some modification of the drive means for the workpiece clamping and feeding means must be provided; this can readily be achieved by retaining the stepping motors 60 and utilising them to drive the support for the movable clamps 144, e.g. using a rack-and-pinion system. Similarly, means for raising and lowering the upper clamps of each pair in an appropriate sequence is provided.

In using any one of the illustrative systems described above the workpiece may be constituted by a single component, in which case in general the stitching pattern will be likely to be decorative only, or it may be constituted by a plurality of components, in which case the stitching may be constructional and/or decorative. In order to hold the various workpiece components together in the desired relationship while being fed by the workpiece clamping and feeding means, preferably they are temporarily secured in a previous operation by adhesive; in this case there is then little or no risk of displacement of one of the components in relation to the other during the feeding operations.

We claim:

1. An automatic sewing machine system comprising workpiece support means (44'; 40, 44; 40', 44; 40", 44; 142, 144, 44) for supporting a workpiece, said means having an elongated aperture (42), workpiece clamping means (46; 142, 144) co-operable with the workpiece support means and including at least two clamping means, one at each side of said elongated aperture (42), for holding a workpiece against the workpiece support means, and a sewing head (32), including a reciprocable needle (N), also arranged in alignment with said aperture (42) such that the needle, as it reciprocates, can pass therethrough, wherein at least one of the workpiece support means and workpiece clamping means comprises feeding elements (46; 144), arranged at opposite sides of the elongated aperture, whereby a workpiece held therebetween as aforesaid can be fed in a first direction extending transversely of the aperture and thus relative to the needle in said first direction, said system further comprising drive means (24) for effecting relative movement between the sewing head and the workpiece support means and the workpiece clamping means, in a second direction extending parallel to the elongated aperture, said system being characterized by a camera (70) and co-operating light source (72) arranged in alignment with said elongated aperture, said camera being disposed above said elongated aperture and said light source being disposed below said elongated aperture such that the feeding elements are effective to feed a workpiece as aforesaid in said first direction relative to the camera and light source and also the drive means is effective to cause relative movement to take place between the camera and light source and the workpiece support means and the workpiece clamping means, and computer control means for controlling the operation of the feeding elements (46; 144) and also of the drive means (24), and being further characterized in that, with a workpiece held between the workpiece support means and the workpiece clamping means in a first, shape-recognition operation by effecting relative movement between the workpiece and the camera in at least said first direction, the outline of said workpiece, as it passes over the elongated aperture, can be detected by the camera, and thereafter, while the workpiece remains thus held, in a second sewing operation by effecting relative movement between the workpiece and sewing head in said first and second directions in timed relation with the reciprocation of the needle, the workpiece is thus sewn in accordance with a desired stitch pattern.

2. A system according to claim 1 characterized in that after said outline has been detected by the camera (70) as aforesaid and in response to such detection the computer control means is effective both to recognize the workpiece shape and also to determine its orientation in relation to the workpiece support means, and in response to such recognition and determination to identify, from a plurality of sets of stitch pattern data stored in a memory of the computer control means, a particular set of data previously associated with the recognized workpiece and to modify the data of said set according to the orientation of the workpiece, whereafter, while the workpiece remains held between the workpiece support means and workpiece clamping means, in said sewing operation relative movement is effected between the workpiece and the needle along a desired stitch pattern as determined by the modified set of data in timed relation with the reciprocation of the needle and is thus sewn in accordance with said pattern.

3. A system according to claim 1 characterized in that prior to the outline of a workpiece being detected as aforesaid the workpiece is fed backwards and forwards in said first direction by the feeding elements in a small number of passes.

4. A system according to claim 1 characterized by
   a frame on which the camera (70) and light source (72) and also the sewing head (32) are fixedly mounted, and
   a carriage (16) on which the workpiece support means and the workpiece clamping means are carried and which is mounted on the frame for movement relative to the camera and light source and also relative to the sewing head in said second direction under the operation of the drive means.

5. A system according to claim 1 characterized in that each feeding element comprises a driven roller (46) the overall diameter of which is in the order of 10 to 15 mm.

6. A system according to claim 5 characterized in that the workpiece-engaging surface of each feeding element (46) has a frictional co-efficient substantially greater than that of the opposite workpiece-engaging surface provided by the other of the workpiece support means and workpiece clamping means.

7. A system according to claim 6 characterized in that the workpiece-engaging surface of each feeding element (46) is constituted by a layer of a tacky but non-adhesive material.

8. A system according to claim 6 characterized in that the workpiece-engaging surface of each feeding element (46) is constituted by a layer of abrasive material, such as emery paper or cloth.

9. A system according to claim 6 characterized in that said opposite workpiece-engaging surface is provided by two or more rollers (40), at least one of which is arranged at each side of the elongated aperture (42), and in that the workpiece-engaging surface of each of said rollers (40) is provided by a layer of deformable material which does not wholly conform to the contour of the workpiece engaged thereby.

10. A system according to claim 5 or claim 6 or claim 7 or claim 8 characterized in that a numerical controlled motor means (60) is provided for driving the feeding elements (46) in timed relation with the reciprocation of the needle, and in that the drive means also comprises numerical controlled motor means (24) for effecting relative movement in said second direction.

11. A system according to claim 2 characterized in that prior to the outline of a workpiece being detected the workpiece is fed backwards and forwards in said first direction by the feeding elements in a small number of passes.

12. A system according to claim 2 characterized by
a frame on which the camera (70) and light source (72) and also the sewing head (32) are fixedly mounted, and
a carriage (16) on which the workpiece support means and the workpiece clamping means are carried and which is mounted on the frame for movement relative to the sewing head in said second direction under the operation of the drive means.

13. A system according to claim 9 wherein the deformable material is expanded polystyrene.

* * * * *